United States Patent
Kleinhout et al.

(10) Patent No.: US 9,996,631 B2
(45) Date of Patent: Jun. 12, 2018

(54) INFORMATION MANAGEMENT AND DISPLAY IN WEB BROWSERS

(71) Applicant: OPERA SOFTWARE AS, Oslo (NO)

(72) Inventors: Huib Kleinhout, Hagan (NO); Rik van den Munckhof, Oslo (NO); Christopher Svendsen, Oslo (NO)

(73) Assignee: OPERA SOFTWARE AS, Oslo (NO)

( * ) Notice: Subject to any disclaimer, the term of this patent is extended or adjusted under 35 U.S.C. 154(b) by 194 days.

(21) Appl. No.: 14/037,073

(22) Filed: Sep. 25, 2013

(65) Prior Publication Data

US 2014/0365853 A1    Dec. 11, 2014

Related U.S. Application Data

(60) Provisional application No. 61/705,524, filed on Sep. 25, 2012.

(51) Int. Cl.
*G06F 17/30* (2006.01)
*G06F 17/22* (2006.01)

(52) U.S. Cl.
CPC .... *G06F 17/30902* (2013.01); *G06F 17/2235* (2013.01); *G06F 17/2247* (2013.01); *G06F 17/30598* (2013.01); *G06F 17/30864* (2013.01); *G06F 17/30905* (2013.01)

(58) Field of Classification Search
CPC ............. G06F 3/0481; G06F 17/30905; G06F 17/2235; G06F 17/2247; G06F 17/30598; G06F 17/30864; G06F 17/30902
See application file for complete search history.

(56) References Cited

U.S. PATENT DOCUMENTS

| 2006/0075357 A1* | 4/2006 | Guido ............... G06F 3/0485 715/784 |
| 2006/0136673 A1 | 6/2006 | Chen et al. |
| 2006/0265653 A1* | 11/2006 | Paasonen ............ G06F 3/0485 715/704 |
| 2006/0277478 A1* | 12/2006 | Seraji ................. G06F 3/0481 715/760 |
| 2007/0016543 A1* | 1/2007 | Epling ............ G06F 17/30884 |
| 2008/0005686 A1 | 1/2008 | Singh |
| 2010/0070928 A1* | 3/2010 | Goodger .......... G06F 17/30905 715/838 |

(Continued)

FOREIGN PATENT DOCUMENTS

CN    1265208 A    8/2000
RU    2007 143 132 A    6/2009

OTHER PUBLICATIONS

Jase0910, "Full screen auto-hide of tabs, address bard, bookmarks bar", Jan. 29, 2012, Google Chrome Help Forum, p. 1.*

(Continued)

*Primary Examiner* — Scott Baderman
*Assistant Examiner* — Seung Jung
(74) *Attorney, Agent, or Firm* — Birch, Stewart, Kolasch & Birch, LLP

(57) ABSTRACT

New ways of presenting information in a web browser are presented wherein documents categorized as belonging to the same web site or application are grouped together and presented in either an first mode where a browser window is open and one of the resources categorized as belonging to the group is displayed, or in a second mode where the group is represented by an icon.

20 Claims, 5 Drawing Sheets

(56) References Cited

U.S. PATENT DOCUMENTS

| | | |
|---|---|---|
| 2011/0271217 A1 | 11/2011 | Cruz Moreno et al. |
| 2012/0131441 A1* | 5/2012 | Jitkoff ............... G06Q 30/0641 |
| | | 715/234 |
| 2012/0131485 A1 | 5/2012 | Svendsen et al. |
| 2012/0191715 A1* | 7/2012 | Ruffner ............ G06F 17/30011 |
| | | 707/738 |
| 2013/0014037 A1* | 1/2013 | Fisher .................... G06F 9/542 |
| | | 715/760 |
| 2013/0159319 A1* | 6/2013 | Duan ............... G06F 17/30873 |
| | | 707/748 |
| 2015/0198998 A1* | 7/2015 | Nanda .................. G06F 1/3234 |
| | | 713/323 |
| 2015/0205462 A1* | 7/2015 | Jitkoff ............... G06F 17/30876 |
| | | 715/777 |

OTHER PUBLICATIONS

"Take Control and Manage Your Tabs Automatically With Tab Wrangler [Chrome]", Feb. 18, 2012, pp. 1-6, XP055116772, Internet, Retrieved from the Internet: URL: http://www.makeuseof.com/tag/control-manage-tabs-automatically-tab-wrangler-chrome/ [retrieved on May 7, 2014].

\* cited by examiner

INFORMATION MANAGEMENT AND DISPLAY IN WEB BROWSERS

This nonprovisional application claims the benefit of U.S. Provisional Application No. 61/705,524 filed on Sep. 25, 2012. The entire contents of the above application is hereby incorporated by reference.

FIELD OF THE INVENTION

The invention relates to web browsers and similar software applications that are able to retrieve and display content from websites or other resources accessible over a computer network. In particular the invention relates to methods, devices and computer program products for accessing, maintaining and displaying information obtained from a data resource.

BACKGROUND OF THE INVENTION

The first web browsers included a window for displaying the contents of a web document framed by an area with user interface controls for, e.g., back and forward navigation, reloading and returning to a defined "home page," opening locally stored files, entering a web address or uniform resource locator (URL), and printing a document. Over the years some additional functionality has been added; the most important development has probably been the introduction of tabbed browsing, which introduced the ability to open several documents inside one browser window and use tabs for switching between documents.

An advantage with tabs is that a user can quickly switch between web documents without having to navigate or reload information. Furthermore, state information (such as scroll position and text entered in forms) is maintained in each tab and not lost when the user switches to a different tab.

However, the traditional user interface controls described above are rigid and do not give web applications full control over the user interface. For instance, many web applications can give unexpected or inefficient results when using back navigation. Particularly, if the page navigated back to was one that automatically forwarded the browser to the page the user attempted to navigate back from, the browser will go back and forth between the same two pages each time the user clicks on the "back" button. As a result of this, many "native" applications, particularly on mobile platforms such as the Android™ operating system provided by Google and the iOS operating system provided by Apple, are simply web applications presented through a web browser without user interface controls (a so-called "chromeless" browser).

There are also disadvantages with the browser tabs. They are manually created and deleted by users. Because managing them requires time and an effort, they are typically not used effectively. It is common for users to have several tabs open of the same page, leading to confusion and wasted computer resources. Also, users tend to accumulate more and more tabs over time because they do not want to close potentially important documents; and the more tabs that are added, the more time it takes to find a particular tab. The situation is often made even worse by the fact that browsers show tabs and webpages simultaneously in a limited amount of screen space.

Browser developers have tried to compensate for these limitations in various ways. Some browsers include a visual overview of the tabs, where users can manually switch to a view providing, for example, thumbnail presentations of the content in each tab. Other browsers close all tabs when the browser is closed, and start with only one tab when the browser is restarted, causing information to be lost between browsing sessions. Certain browser extensions also exist, for example, to find tabs with duplicate content.

The situation, however, is still one where users must manually maintain information if they want to keep it and not lose control, or they must accept the loss of information between browsing sessions. The situation clearly is one where improvement is needed.

SUMMARY OF THE INVENTION

The present invention, in its various aspects, addresses these shortcomings and provides solutions that at least help mitigate them and provide users with alternative ways of managing, accessing and viewing information.

In a first aspect of the invention, methods, devices and computer program products are provided in which a web browser presents information by automatically detecting characterizing features that are part of data received from a resource such as a webpage. Based on the characterizing features, the browser groups data resources and effectively treats the resources of each group as belonging to one application. The different resources or web pages that are treated as belonging to the same application are represented as different states of that application, and the different applications (groups of data resources) can be presented as icons, tabs or thumbnails in an overview of applications. The browser may be configured to classify and maintain data automatically without requiring an effort from the user.

In a second aspect of the invention, methods, devices and computer program products are provided where a browser is configured to toggle between the following two modes: a first mode in which a browser window is open to display content provided by a resource; and a second mode in which a grid of minimized browser windows are presented.

In a third aspect of the invention, methods, devices and computer program products are provided for classifying resources (such as webpages) as belonging to an existing group of resources if certain requirements associated with that group are fulfilled, and to create a new group and new requirements if no existing requirements are fulfilled. Group membership and requirements may be dynamically updated in this aspect.

In a fourth aspect of the invention, documents loaded into a web browser are maintained automatically in order to maintain document information and state information over time based on an estimated importance of the document.

DETAILED DESCRIPTION

Figure 1:
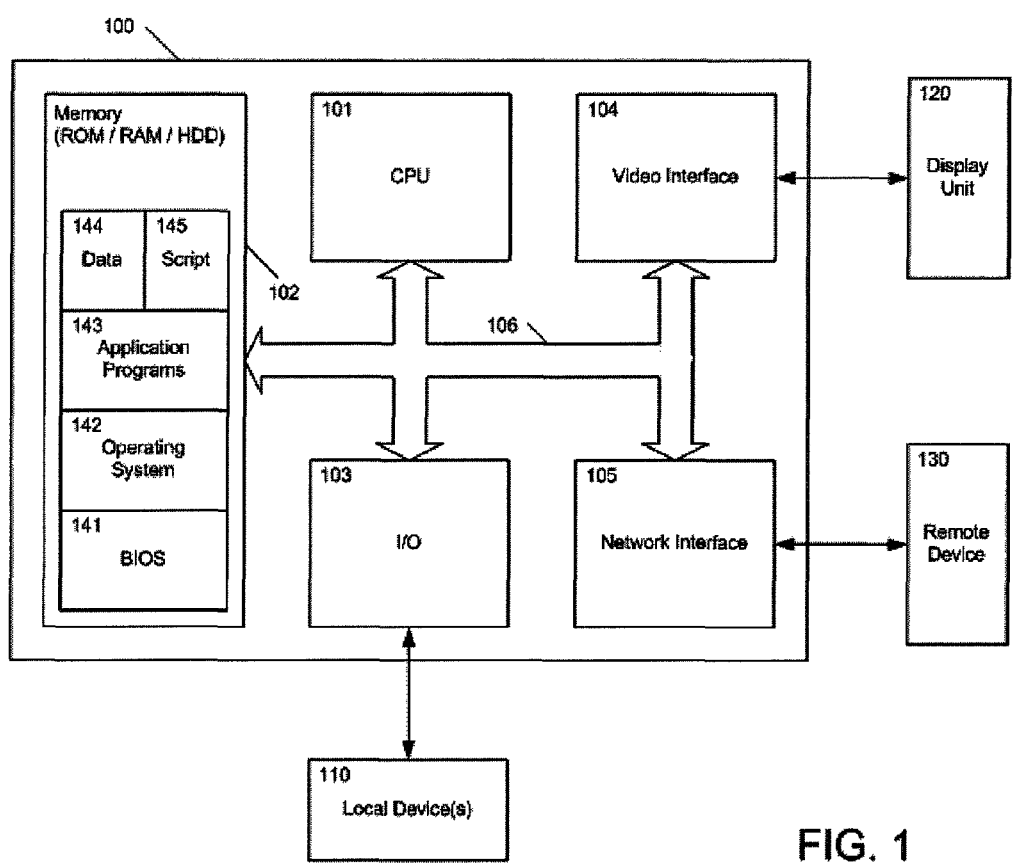
FIG. 1 illustrates a generalized computer system that can be used as an environment for implementing various aspects of the present invention.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The invention relates to the management and presentation of information in browsers, particularly, to the organization and presentation of information in a manner that is more analogous to the way applications are handled by operating systems and window managers, than the way websites and webpages have traditionally been handled by web browsers.

Within the specified paradigm, websites have two main states: minimized and opened. In an opened state, the website may be presented in full screen mode, contrary to regular browsers which always show some UI controls.

In minimized state the websites are represented as a list or grid of applications with icons, screen shots and/or website names. However, certain aspects of the invention may also be combined with the traditional tab representations of minimized web sites.

When switching from a minimized state to an opened state, the application may be restored in the "most relevant state." The most relevant state may be the latest accessed document on the website, the most frequently accessed page on the site, or the start page of the website (by default the domain name without path).

In the minimized state, the application can show notifications about updates of the website. These updates can be based on new RSS feed items on the provided feeds, notifications as specified in the HTML5 standard, and/or changes in the start page.

In the following description of various exemplary implementations of the various aspects of the invention, certain terms and phrases will be used consistently. As such, a "resource" is generally understood as any concept that can be given an identity which can be expressed by a well formed URI (Uniform Resource Identifier), even abstract concepts or resources that are not retrievable by a computer (e.g., a person). The invention, however, is primarily concerned with retrievable resources. Such resources will be referred to as "retrievable resources," "resources that can be accessed by a computer," or similar terminology. If the term "resources" is used alone, it is still intended to refer to concepts that are in some sense present in a computer network, and some aspect of which must be accessible or retrievable by a computer and capable of being represented or displayed by a web browser. Such resources are usually, but not exclusively, of the type that can be identified by a URL (Uniform Resource Locator). A resource may, however, be one that primarily receives data (such as a printer), but even such a resource will provide some data in response and, thus, can be thought of as a resource from which data can be retrieved without loss of generality. Also, no attempt will be made to distinguish between the resource itself and data retrieved from the resource. For the purposes of this disclosure, data retrieved from the resource can be thought of as an aspect of the resource, and displaying a resource and displaying data retrieved from a resource should be understood as synonymous.

The term "web browser" is intended to refer to any software application or software/hardware combination that can act as a user agent, retrieve resources using communication protocols and display a representation or rendering of the data that has been retrieved. The term "browser window" will primarily refer to the actual display window, i.e., the area in which content is displayed. Unless otherwise noted, the term "browser window" is not intended to refer to the window object handled by a window manager. A "minimized browser window" will refer to a representation in the form of an icon or some other invokable symbol displayed by a device and which opens into an open browser window when invoked.

The term "website" will be used loosely to refer to resources that are associated with each other either for residing on the same server, being related to the same topic and created by the same author or entity or being part of the same domain. A website does not need to have a strict definition. It will be understood that a web browser operating in accordance with the principles of the present invention will, according to some of the inventive aspects, determine whether or not to treat a particular resource (for example a webpage) as part of a website.

According to certain aspects of the invention, websites are treated as applications or web applications. The term application in this context is intended to describe a way of presenting the website (or some other group of related resources), and not as a way of describing the functionality of the resources in terms of any embedded or associated (e.g. residing on a related server) interactivity, script or other capability. However, none of the aforementioned functionality is excluded from being part of an application when the term is used in this sense.

FIG. 1 illustrates a generalized computer system 100 that can be used as an environment for implementing various aspects of the present invention. According to exemplary embodiments, it is contemplated that the computer system 100 may be implemented as any of various types of general purpose computers including, but not limited to, servers, desktop computers, laptop computers, distributive computing systems and any other types of computing devices and systems as will be contemplated by those of ordinary skill in the art. However, certain aspects of the invention are believed to be particularly useful in smart phones, tablets and other devices with touch screen user interfaces, but are in no way limited to such devices.

In FIG. 1, computer system 100 has various functional components including a central processor unit (CPU) 101, memory 102, communication port(s) 103, a video interface 104, and a network interface 105. These components may be in communication with each other by way of a system bus 106.

The memory 102, which may include ROM, RAM, flash memory, hard drives, or any other combination of fixed and removable memory, stores the various software components of the system. The software components in the memory 102 may include a basic input/output system (BIOS) 141, an operating system 142, various computer programs 143 including applications and device drivers, various types of data 144, and other executable files or instructions such as macros and scripts 145.

A communication port 103 may be connected to a mouse device 110. Other communication ports may be provided and connected to other local devices 140, such as additional user input devices, a printer, a media player, external memory devices and special purpose devices such as, e.g., a global positioning system receiver (GPS). Communication ports 103, which may also be referred to as input/output ports (I/O), may be any combination of such ports as USB, PS/2, RS-232, infra red (IR), Bluetooth, printer ports, or any other standardized or dedicated communication interface for the mouse 110 and any other local devices 140.

The video interface device 104 is connected to a display unit 120. The display unit 120 might be an integrated display. For instance, if the computer system 100 is implemented in a portable device, such as a laptop or "netbook" computer, the display will generally be an integrated display such as an LCD display. However, the display unit 120 does not have to be integrated with the other elements of the computer system 100, and can instead be implemented as a separate device, e.g., a standalone monitor.

The network interface device 105 provides the computer system 100 with the ability to connect to a network in order to communicate with a remote device 130. The communication network, which in FIG. 1 is only illustrated as the line connecting the network interface 105 with the remote device 130, may be, e.g., a local area network or the Internet. The remote device 130 may in principle be any computing device or system with similar communications capabilities as the system 100, such as a server or some other unit providing a networked service.

It will be understood that the computer system 100 illustrated in FIG. 1 is not limited to any particular configuration or embodiment regarding its size, resources, or physical implementation of components. For example, more than one of the functional components illustrated in FIG. 1 may be combined into a single integrated unit of the system 100. Also, a single functional component of FIG. 1 may be distributed over several physical units. Other units or capabilities may of course also be present.

Figure 2:
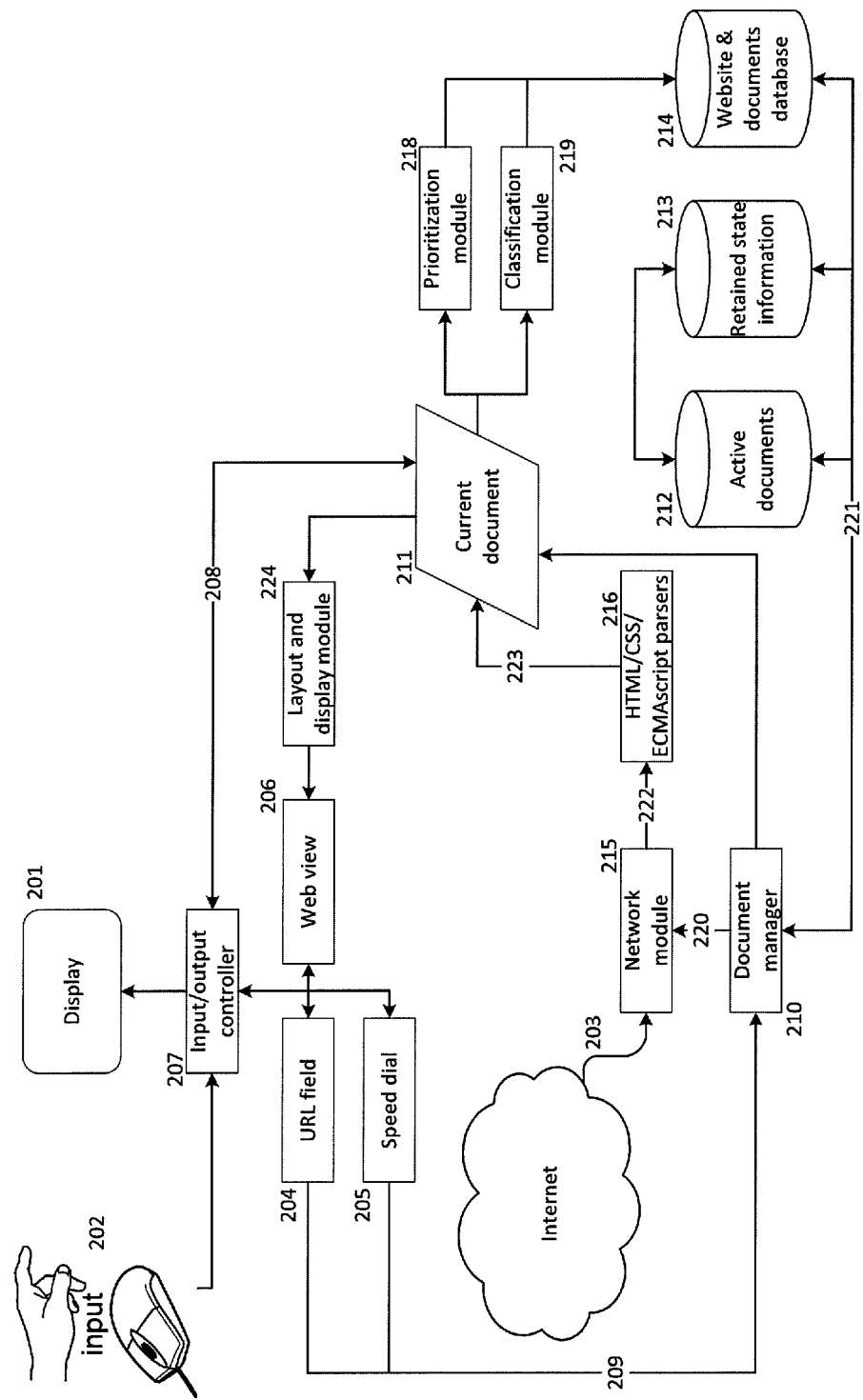
FIG. 2 illustrates a representation of a device operating in accordance with principles of an exemplary embodiment of the present invention in terms of hardware/software modules, functionality and data transfer.

Reference is now made to FIG. 2, which illustrates an exemplary embodiment of a device operating in accordance with principles of the present invention. It will be understood by those with skill in the art that the illustration in FIG. 2 represents a combination of hardware modules, software modules, functionality and data transfer. Whether a particular feature is implemented in hardware, software, or a combination thereof may in some cases be a matter of design choice; in other cases, it will be evident to the skilled artisan how the feature must be implemented. For the purposes of the following explanation, it will not be necessary to distinguish between these.

The device of FIG. 2 includes a graphical display 201 and an input device such as a touch screen, mouse, pen 202 and network connection using for instance 2/3/4G cellular network communication, wired or wireless.

On the device display 201, a graphical user interface may be displayed. The graphical user interface may include a URL field 204, in which the user can enter text using a user interface text input control. In the URL field 204, the user can typically specify locations of new documents to be loaded by typing URL's, search queries or selecting one of the suggested URL's/search queries that are predicted based on partially-entered input. Alternatively, or in addition to the URL field 204, a visual representation 205 of inactive websites or webpages may be presented (illustrated as a "speed dial" interface in FIG. 2). According to one aspect of the invention, these representations 205 will represent web applications or applications, as will be described in further detail below.

A user interface control 206 is configured to display a document loaded from the Internet on the display 201. The user can interact with the document as long as it is rendered on the display 201, primarily through the input device 202.

An input/output controller 207 may regulate user input (such as clicks or touches), and also regulate output, for example, through the rendering of controls 204 and 205 and web documents 206 such that they are displayed based on predictable user-interface interaction sequences and are able to receive user input when needed.

User input events can cause a change in state of the displayed document. This state information is communicated (as illustrated by data transfer 208) between the input/output controller 207 and a representation of the current document 211 in memory.

Users can provide input 202 to one of the controls 204 and 205 to initiate requests for presenting a particular document. Such a request is communicated (as illustrated in data transfer 209) to a document manager 210, which manages the currently displayed document 211. The document manager may also manage a list of active documents stored in memory 212, and have access to a database 213 containing state information about documents, as well as a database 214 containing information about relations between documents and websites/applications.

When the user requests a new document, or when a new document (or some other retrievable resource) is requested as a result of code in a document that is already loaded, the document manager 210 will query the database of active documents 212 in order to determine if the document is already available locally. If the document is available, it will become the current document 211 and be displayed in the webview 206. If the document needs to be loaded or reloaded because it is not stored in memory 212, or because it has expired, the document manager 210 performs a new request using a network module 215 which handles communication over the Internet 203.

If the operating system or the web browser itself determines that it becomes necessary to reduce the amount of resources used by the web browser, the document manager 210 will remove one or more active documents from memory 212. The documents that are being removed may be chosen based on information about the documents stored in memory 214. Before removing a document from memory, important state information may be stored in memory 213.

The network module 215 sends and receives data 222 for new document requests, and performs network activity for active documents 212. When new data is loaded by the network module 215 the HTML/CSS/ECMAscript parsers 216 parse and analyze the data so that it can be displayed or run in the related document, which can be the active document 211 or any one of the documents in memory 212. When a document has completed loading sufficiently, the document manager 210 may recover retained state information such as form data from a database 213. The structure element in a HTML document can be calculated and rendered by the layout and display module 224 so that it can be displayed in a user interface control 206.

Whenever the user interacts with a document (as communicated in 208) or when new data 222, 223 arrives, the state of the document changes. Information about document changes may be sent to a prioritization module 218 and a classification module 219. In accordance with some aspects of the invention, the prioritization module 218 may determine a relative priority for the current document 211, and the classification module 219 may determine to which application the document belongs. This information may then be stored in memory 214 and used by the document manager 210 when restoring documents 221.

Figure 3:
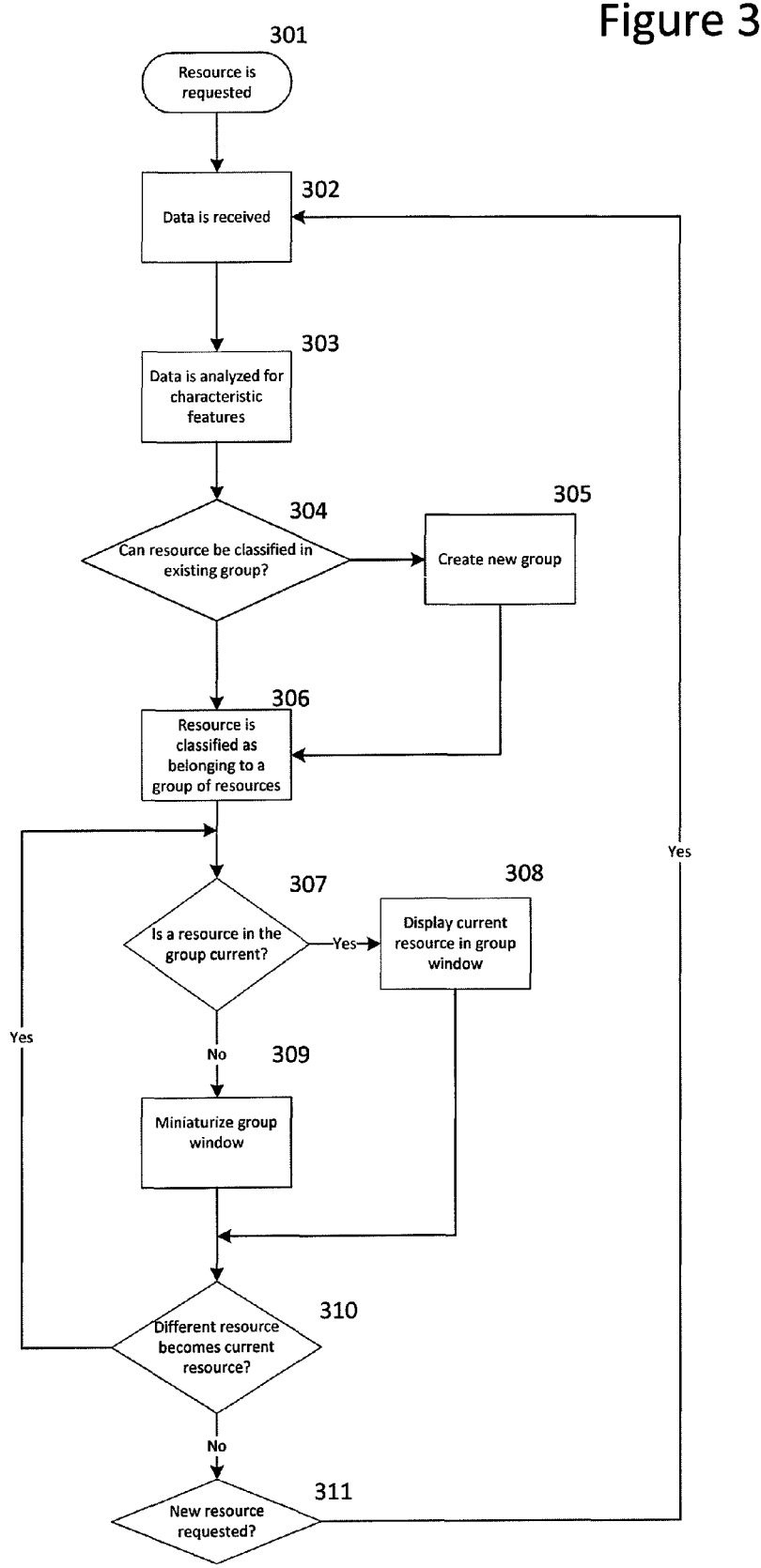
FIG. 3 is a flow chart illustrating a process according to an exemplary embodiment of the present invention.

Reference is now made to FIG. 3, which illustrates in a flow chart a method consistent with the principles of the invention. The method starts in a first step 301 in which a resource accessible over the Internet 203 is requested, typically over the network module 215. It will be assumed that this is not the first resource that is requested, and that active resources are already stored in memory 212. Collectively these resources can be thought of as a plurality of resources that are accessible by the web browser.

After data is received in step 302, an analysis is performed in step 303 in order to identify characterizing features. Based on this analysis, it is determined if the resource can be classified in an existing group in step 304. If this is not the case, a new group is created in step 305. In step 306, the resource is classified as belonging to the appropriate group.

In step 307, it is determined whether a resource in that particular group is the current resource, such as the current document illustrated as 211 in FIG. 2. If this is the case, the current resource is displayed in an open browser window in step 308 (i.e., in a "first mode"). If the recently classified resource or some other resource in the group is the current resource, the browser window associated with the group will be open and the current resource will be displayed in step 308. Otherwise the window associated with the group will be minimized and either displayed in step 309 (i.e., in a "second mode") as an icon, a tab, a thumbnail or something similar, or it may be temporarily hidden.

Following step 308 or 309, the process may return to step 307 if a different resource becomes the current resource (as determined in step 310), or to step 301 if a new resource is requested (as determined in step 311).

In some embodiments consistent with the principles of the invention, while in the first mode mentioned above (where the browser window is open and displaying a resource belonging to a particular group of resources), the web browser does not display any permanent user interface element associated with the browser itself (such as, for example, the URL field 204, the speed dial interface 205, back, forward or reload buttons, etc). Instead, in such embodiments, only information obtained from, or representative of a resource belonging to the active group of resources, is displayed. These embodiments serve to hand control over to the group of resources themselves, and the group of resources may be thought of as an individual application. Web authors or designers may then create web applications in which all user interface controls that are relevant to the user, when accessing the particular website, are embedded in the webpages themselves. The website, or a part of the website, will then be experienced as an application by the user, and the various webpages belonging to the web site will be experienced as different states of the application. The classification performed by the web browser in steps 304, 305 and 306 will, of course, attempt to group together all resources that will be experienced as part of the same application into a single group. The characterizing feature by which a resource is classified into its respective group may be, for example, meta information embedded in the received data, and a domain name in the URL identifying the resource. A particular group of resources may also be created for the resources that represent hardware connected to, or accessible from, the device on which the web browser is installed. The characterizing feature causing such resources to be classified together would be that the resources represent hardware, and the group of resources would be analogous to an application for configuring hardware.

The classification of resources will be described in further detail below.

In response to user input the web browser may be configured to toggle between this chromeless browser window of the first mode, and one where a plurality of groups of resources are displayed in the second mode mentioned above, i.e., in the minimized form of an icon, a tab, a thumbnail or the like. The first and second modes may be exclusive in the sense that the web browser either displays only the open window in the first mode, or only a plurality of representations (e.g., in the form of a list or grid of icons) in the second mode. However, as an alternative, it is consistent with the principles of the invention to display the minimized representations either in a part of the screen not used by the open browser window, or overlaying the open browser window, when the second mode is invoked.

As such, the web browser may be configured to toggle between exclusive representations in the first and the second mode, or the web browser may alternatively be configured to display at least one resource from one group of resources in the first mode in one display window while simultaneously displaying at least one representation of a group of resources in the second mode, outside of or superimposed on the first mode display window.

The web browser, when displaying a resource from a group of resources in the first mode may be configured to toggle between a first view displaying content provided by the resource, and a second view displaying data or user interface elements related to the resource or the application. Such data or user interface elements related to the resource or the group of resources can, for example, include: security and trust information, a URL identifying the resource, a list of resources classified as belonging to the group of resources, an action to share the resource, an action to print the resource, an action to select an icon representative of the group of resources, an action to identify the resource as the default resource to display when the group of resources is opened in the first mode, and an action to remove a resource from a list of resources classified as belonging to the group of resources.

The user interface may provide different overviews of known websites in a presentation of groups of resources in the second mode. For example, when presenting recently accessed websites, the browser may provide a list including an overview of websites by access time. Access time is the last time when the user opened and interacted (clicked, typed in data, etc.) with the website. When opened, the last accessed website is selected, and the user can browse through the list to see and open websites that have been accessed earlier.

Another alternative is a "speed dial" mode, which is a view that may show all websites as tiles in a series of grids. The user can manually move a new website to "favorite websites," for instance, by dragging it from the "history list" to "favorite websites." One speed dial item may consist of a group of documents and/or websites. When clicked on the item, the group is shown in a grid. The group may close by clicking outside the grid.

The web browser, when displaying a plurality of groups of resources in the second mode, may be configured to, in response to user input, switch between two or more of the following types of views: a display of a plurality of groups of resources that have recently been accessed; a display of a plurality of groups of resources that represent user favorites; and a display of a plurality of groups of resources that represent all applications represented in memory.

A display of a plurality of groups of resources in the second mode may, of course, extend outside a window or viewport in the form of a scrollable list or in the form of multiple pages.

A database, such as that illustrated as 214 in FIG. 2, may be used to maintain a list of groups to which resources have been classified as belonging. Each group of resources in this list may be associated with information such as a graphics element representing an icon or a logo, a text string representing a title, an identification of characterizing features used to determine when a resource belongs to the group of resources, and/or a list of resources already classified as belonging to the application.

According to one embodiment of the invention, a web browser may receive user input representing the selection of a link inside a resource classified as belonging to a first group of resources, while such resource is presented in the first mode. If the link identifies a resource classified as belonging to a second group of resources, the web browser may then perform the following operations: change the presentation of the first group of resources from the first (i.e., open) mode to the second (i.e., minimized) mode, and then open the second group of resources in the first mode and display information representing the resource identified by said link.

If the web browser receives user input representing the selection of a group of resources that is currently minimized, the associated browser window will be opened and information representing a resource classified as belonging to the selected group will be displayed. The resource that is displayed may be chosen as a result of being a default resource for the selected application, or of being the most recent resource displayed as belonging to said selected application, or of being the most important resource belonging to said selected application as determined by an importance score calculated for each resource classified as belonging to the corresponding group.

According to a second aspect of the invention, a method of representing a plurality of web browser windows in one of two modes is presented in further detail. According to this aspect, a representation of a plurality of resources that are accessible from a web browser is maintained in memory. The plurality of data resources are divided into subsets, each subset being associated with a respective browser window. These browser windows can then be presented in one of two modes: a first mode in which one of the browser windows is open and content provided by an associated resource is displayed; and a second mode in which the browser window is minimized. Further, the web browser may be configured to toggle between displaying one open browser window, and displaying a grid representing a plurality of said minimized browser windows.

According to this aspect, each subset of resources associated with a browser window may be associated through one or more common characterizing features, as described above. However, in alternative embodiments, the subset of resources may be associated through a common browser history independent from the browser history of any other browser window. Instead of the traditional tabbed browsing, a user may then toggle between viewing web content, and viewing representations of browser windows in the form of icons or thumbnails representing, for example, a most recent web page viewed in that window. Again, the icons or thumbnails may be presented as a grid, or a vertical or horizontal list.

Figure 4:
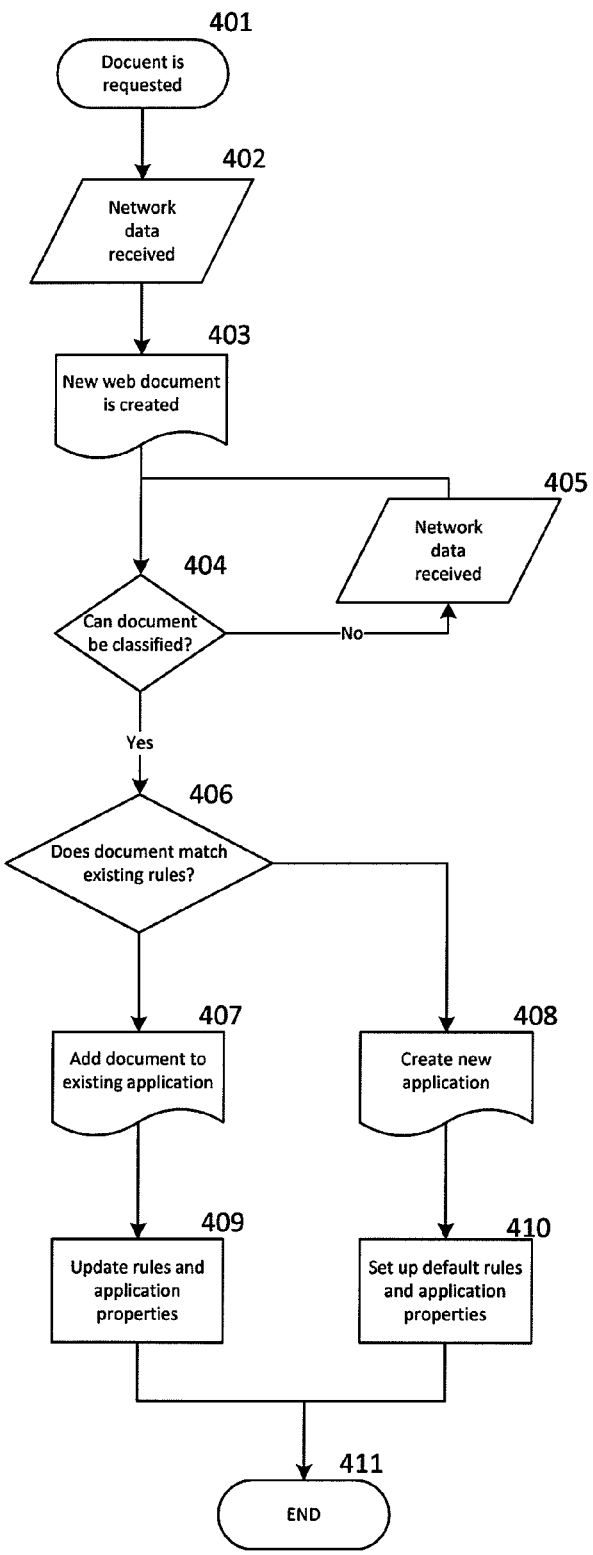
FIG. 4 is a flow chart illustrating a process for classifying webpages as belonging to distinct groups, and presenting the various groups as applications or web applications, according to an exemplary embodiment of the present invention.

Reference will now be made to FIG. 4, which illustrates the process of classifying the webpages as belonging to distinct groups, and presenting the various groups as applications or web applications. A website can be classified based on different types of concepts. For instance, websites representing an application (e.g., gmail), a brand (e.g., nike.com), or an information channel (myblog.blogger.com) may classified into a respective group. Resources may also be grouped together based on other criteria, for example for being hardware or peripherals, as already mentioned above. According to this aspect of the invention, all such groups may be thought of as applications.

Each website typically consists of many documents. The present invention, in a third aspect, automatically categorizes to which web application, application or web site a particular document belongs. To do this, the browser maintains a list of websites in a database 214. In the database 214, each website may be associated with properties such as meta information such as logo and title, position of the website in the user interface when presented as an icon in a grid, a list of rules used to classify which documents belong to the website, and a list of document which belong to the website.

First, a new document is requested in step 401 and subsequently loaded in step 402. In step 403, a new web document is created and stored in the database of active documents 212. If the loaded document is also the current document 211 it will be displayed on the display 201 of the device. But the browser needs to determine to which website the document belongs. This process may start in step 404 while the browser is still receiving data, and the process will continue to monitor incoming data according to step 405 as long as the document cannot be classified. When enough data has been received, and it is determined in step 406 that the document does match existing rules, the document can be added to an existing application in step 407. This decision may be made based on certain properties of the document and a list of rules. If the properties of the document matches the rules of a particular website or, it will be registered as part of that website or application. The rules for adding documents to the application may then be updated in step 409 before the process is terminated in step 411.

If the document still cannot be classified when all data has been received, it will be determined in step 406 that the document does not match the rules for any existing website or application. The process will move on to step 408 where a new application (e.g., website or group of resources) is created and stored in database 214. New rules for adding documents to the newly created application will then be created in step 410, and the process is terminated in step 411.

The classification of documents can be a dynamic, iterative process. A document could initially be classified as a part of particular application, but later the classification could change and the document could be classified as part of a different application when a new rule, or more data matching an existing rule, becomes available.

A rule for classifying websites may output a score (Boolean or scalar) based on the input of a property value. The matching can be assisted with regular expressions, hash functions and/or combinations of Boolean logic. For instance, a website titled "My Site" could have the following rules:

If the hostname of the web document contains with "my.site.com" or "mysite.com," the rule returns "true."

If the hostname is "login.site.com" and the previous page is "my.site.com," the rule returns "true."

Document properties that can be used for rules include:

The URL and its properties, such as protocol, host name, path.

Links to and from the document. Links can be navigation elements in HTML pages such as "anchor" elements, or user invoked loads such as a java script that sends an HTTP submit/request when a user performs a certain action on the document (such as clicking a link).

Logos, site icons, or such that are specified in "icon," "shortcut icon," "apple-touch-icon," "apple-touch-icon-precomposed," "property og:image" or "itemprop image," or images containing the word "logo."

Other particular tags or text in the document, for instance, the contents of the <title> tag in <head> in HTML documents.

There may also be different types of rules for classifying documents. A first type is standard rules. For instance, if a new website is created, the following default rule may be established:

For all documents with the same domain name, the rule returns "true."

A second type of rule is server rules. The browser can query a server to return websites that match a certain document based on URL.

A third type of rule is auto-generated rules. These are rules that are automatically created based on analysis of the documents and browsing behavior. For instance, a new rule created when the browser finds links from a document from the domain "domain.com" to "domain.no" to match all documents from "domain.no" as part of the website "Domain Software."

When a document is loaded that doesn't match any website, a new application is created in the browser's database. In some embodiments, the browser may extract properties to generate a visual representation of the website. The name of a website can be extracted from "meta" elements in HTML, or using one or more regular expressions matching common used patterns for document titles, such as "document name—website name." Different names can be stored for different languages, based on the domain name extension or language specified in the HTTP response. The logo of the website can be extracted using the commonly used logo specifications mentioned above. The start page of the website, by default the hostname without path, can be chosen as the default "state" of the new application when it is opened.

Figure 5:
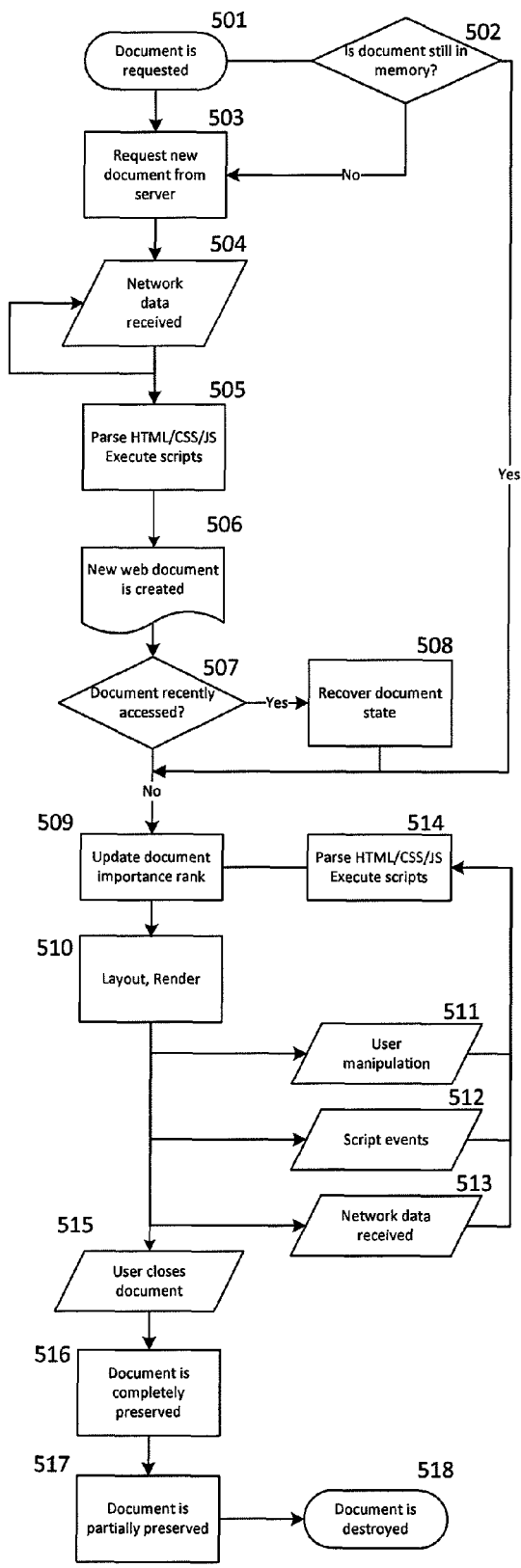
FIG. 5 is a flow chart illustrating a process for maintaining documents in memory according to an exemplary embodiment of the present invention.

Reference is now made to FIG. 5, which illustrates how documents are maintained in memory.

In a traditional tabbed browser interface, the current document in each browser tab is kept in memory for quick access and to preserve state information, and when a user navigates to a new document, the previous document is completely or partially removed from memory.

In contrast to classic browser tabs, an aspect of the present invention automates management of the lifetime of document.

A document life cycle starts with a request for a document in step 501, typically using a URL. If the document is still in memory, as determined in step 502, it can be displayed immediately and processing proceeds to step 509 where the document rank, or importance score, is updated as described in further detail below. If the document is no longer in memory, or has not been previously accessed, the process moves to step 503, where the browser performs a network request. The browser then receives data 504 from the network, and parses the information in step 505. The data, consisting of HTML, CSS, java script (ECMAscript) and related resources are loaded into memory. When the browser has received sufficient data, the browser creates a document 506 for the webpage that is being loaded.

When the document is completely or mostly loaded, and it can be determined in step 507 that it has been recently accessed, the browser recovers state information in step 508 from database 213 (FIG. 2). The document's rank, or importance score, may then be updated in step 509, and the document's layout is determined and the document is rendered in step 510.

When a document is loaded in a browser, the document, scripts and other elements may be modified due to events. These events include user interaction 511, new network data 512, and script events 513. Each time the document is changed because of such events, the browser again parses the document in step 514, and updates the "importance score" of the document in a return to step 509. Importance score can be based on a set of rules and properties of the document.

At some point, the user leaves the document in step 515, for instance, by closing the full website view or navigating to another document or website. When that happens the document can still be retained completely in memory in step 516, but as the number of documents in memory increases some documents need to be removed. This removal of documents may be performed partially from memory according to step 517, and eventually the document is completely removed in step 518.

Before a document gets destroyed, the state information is saved so as little as possible information is lost if the document is recovered at a later time.

State information in a document is information that makes the instance of the document unique, which is impossible to recreate by requesting a new copy of the document from the network. This information can be anything from the whole document to text entered in HTML form fields. Most state information is not relevant for users and can easily be disregarded. However, certain types of state information are relevant for users, and can be recovered. Examples include data in HTML form elements, such as entered text, selected buttons, and list selections. To retain the data, the browser traverses the document for form elements and registers all data, together with a unique identifier (usually the "id" or "name" property) from form elements in a database. Restoring is done by the opposite process. Other state information is the scroll position of documents that are larger than the application window, and the current URL of a document.

Using automatic document management, for each document that is visited by the user, it can be determined how important the state of the document is. This importance score is continuously updated, as described above with reference to step 509. This score of a document is stored in a database, where each document is identified by a unique URL and/or a reference in memory. The reference can, for instance, point to another document.

Since memory and CPU resources are limited, the browser may need to remove old documents from memory when new documents are loaded and stored in memory. This process starts with a notification that a certain threshold for resource usage (CPU/memory) has been surpassed. This notification can come from the OS or from the browser itself. The browser will identify the document with the lowest importance score, retain the state information, and remove the document from memory. If multiple documents are identified with the same lowest score, then the oldest document may be removed. This process can be repeated when, and as long as, the resource usage needs to be decreased.

When the browser closes all documents will be removed from memory, but retained state information will be stored in a database.

Certain documents may specify, using HTTP directives, that they need to be removed from memory when not displayed to the user anymore. The browser may remove these documents earlier from memory and not store or restore state information.

The importance score of a page is a scalar that indicates how important it is to preserve a document completely in memory. Whenever a document changes, the rank is updated. The score can for example be a sum of sub-scores produced by rules. Some rules may output multiples of a limited number of values (for instance zero and one), while others produce a scalar. Rules that produce a score that increases per certain event can be shaped by a mathematical function (such as square root).

In one embodiment, the rules defining the output of sub-scores include:

User Interaction score: the sub-score increases each time the user touches, clicks a pointing device, or presses a key.

Document interaction score: if a document is loaded as result of an HTML form submission, this sub-score increases. The sub-score further increases for each sequential page with form submission. Given a form submission, the sub-score increases above the user interaction sub-score for the previous page.

Encryption level score: documents with encryption may result in a higher sub-score than pages without it.

Loading score: documents that are still loading receive a higher sub-score than documents that have been loaded.

Last document score: a document that was the last documented visited on a website results in a higher sub-score than other documents from the same website.

Classification score: documents with a classification that indicate recoverable information receive a lower sub-score than documents with another classification. This classification of pages can be received from an online database. Classifications that indicate recoverable information may include newspapers, search engines, etc.

Automatic reloading score: documents that automatically reload (i.e., HTML meta refresh, java script reload calls) receive a lower sub-score than pages that don't.

Root node score: when a document is a root node, it receives a lower sub-score than when it is a leaf node. A document is identified as a root node if multiple other documents can be loaded from this document as a result of user requests.

Interactive loading score: this sub-score increases if a page sends load requests (such as HTML XHR) as a result of user interaction.

Several additional features may be included along with the aspects already presented. For example, while a chromeless browser window does not provide the user with any other controls than those included in the web resource itself, certain actions may still be available and invoked by one or more of the following: mouse gestures, swipes, or even by shaking or moving the device if the device includes an accelerometer. Examples include moving back and forward in browsing history using a horizontal swipe. This gesture is visualized by dragging screenshot of previous/next documents in the view. Reload may be triggered by vertical, top-down swipe, similar to how many touch screen apps refresh. Recently accessed websites can be opened by a down-top swipe.

It may also be possible to include a "backside view" of a website to alter settings and behavior of the website. According to one embodiment, a small button on the website icon is displayed for the current selected website in the "recently accessed websites" list. When this button is pressed, the website will flip visually and show the backside view.

The backside view may contain: security and trust information; document actions such as "share" or "print"; a possibility to select an icon for the website; a UI control to select the document to open when the website is opened; and a visual list of bookmarked documents (along with the functionality to remove them).

In some embodiments, when a page is loading, a screen shot of the page is shown with a visual overlay indicating that the page is non-interactive. Specifically, when a link is clicked thus triggering loading of a new document, a visual overlay is added on the page except for an area outlining the clicked link. This link area will show a progress indication (such as moving stripes). When the area outside the link area is clicked, the loading will stop and the previous page will be shown again.

An artificial intelligence module can be notified when a user load a website or a document in a website. Based on available information the module can programmed to predict a number of websites or documents that will be loaded or requested next with a level of confidence associated with each prediction. If the level of confidence exceeds a certain threshold, the document may then be loaded in the background (without being displayed to the user). If in the document is not part of the next prediction set it may be removed from memory again.

What is claimed is:

1. A method of presenting information in a web browser, comprising:

receiving data from a plurality of resources that are accessible from the web browser;

detecting one or more characterizing features that are part of data received from said resources;

classifying resources as belonging to respective groups of resources based on a classification of said one or more characterizing features; and for each group of resources, associating said group of resources with a browser window presented in one of two modes, where in a first mode said browser window associated with said group is open and content provided by a resource classified as belonging to said group of resources is displayed, and in a second mode said browser window associated with said group of resources is minimized;

upon switching from presenting said browser window associated with said group in said first mode to presenting said browser window associated with said group in said second mode, retaining first information identifying said resource classified as belonging to said group of resources;

retaining second information relating to a state in which said resource was presented prior to switching from presenting said browser window in said first mode to presenting said browser window in said second mode, said state including (i) data and selections entered by a user via an interactive control of said resource and (ii) a scroll position; and minimizing said browser window associated with said group of resources; and upon switching from presenting said browser window associated with said group in said second mode to presenting said browser window associated with said corresponding group in said first mode, opening said browser window associated with said group of resources;

using said first information to load said identified resource belonging to said group of resources; and using said second information to determine a state in which to display content provided by said identified resource belonging to said group of resources in said opened browser window, wherein said second information is retained after said web browser is closed and, when said web browser is subsequently reopened and the data of said resource belonging to said group of resources is reloaded, said retained second information is used to display the content of said reloaded resource in said prior state.

2. The method of claim 1, wherein a browser window presented in said second mode is displayed as one chosen from the group consisting of an icon representing the associated group of resources, a tab representing a hidden browser window, and a thumbnail representing information received from a resource belonging to the associated group of resources.

3. The method of claim 1, wherein, while presenting a browser window in the first mode, the web browser displays no permanent user interface element associated with the browser itself, and displays only information obtained from or representative of a resource belonging to the active group of resources; and the web browser is configured to, in response to received user input, toggle between displaying only information from one group of resources while presenting the associated browser window in the first mode, and displaying a representation of a plurality of minimized browser windows associated with respective groups of resources that are presented in the second mode.

4. The method of claim 1, wherein, while presenting a browser window in the first mode, the web browser is configured to display at least one resource from the group of resources associated with the browser window presented in the first mode, and at least one representation of a group of resources associated with a browser window presented in the second mode outside of or superimposed on said browser window presented in the first mode.

5. The method of claim 1, wherein the web browser, when a presenting a browser window in the first mode, is configured to toggle between a first view displaying content provided by a particular resource from the group of resources associated with the browser window presented in the first mode, and a second view displaying data or user interface elements related to the particular resource or the group of resources associated with the browser window presented in the first mode.

6. The method of claim 5, wherein the data or user interface elements related to the particular resource or the group of resources associated with the browser window presented in the first mode is chosen from the group consisting of security and trust information, a URL identifying the particular resource, a list of resources classified as belonging to the group of resources associated with the browser window presented in the first mode, an action to share the particular resource, an action to print the particular resource, an action to select an icon representative of the group of resources associated with the browser window presented in the first mode, an action to identify the particular resource as the default resource to display when the associated browser window is opened in the first mode, and an action to remove a resource from a list of resources classified as belonging to the group of resources associated with the browser window presented in the first mode.

7. The method of claim 3, wherein the web browser, when displaying a plurality of groups of resources associated with browser windows presented in the second mode, is configured to, in response to user input, switch between two or more views selected from the following: a display of a plurality of groups of resources that have recently been accessed, a display of a plurality of groups of resources that represent user favorites, and a display of a plurality of groups of resources that represent all groups of resources represented in memory.

8. The method of claim 7, wherein a display of a plurality of groups of resources extends outside a window or viewport in the form of a scrollable list or in the form of multiple pages.

9. The method of claim 1, wherein said one or more characterizing feature is at least one of meta information embedded in the received data, and a domain name in the URL identifying the resource.

10. The method of claim 1, further comprising:

maintaining a list of groups to which resources have been classified as belonging, wherein each group of resources in said list is associated with information selected from the group consisting of a graphics element representing an icon or a logo, a text string representing a title, an identification of characterizing features used to determine when a resource belongs to the group of resources, and a list of resources already classified as belonging to the group of resources.

11. The method of claim 1, further comprising:

receiving user input representing the selection of a link inside a resource classified as belonging to a first group of resources while the resource from the first group of resources is displayed in an associated browser window presented in the first mode, said link identifying a resource classified as belonging to a second group of resources; and changing the presentation of the browser window associated with said first group of resources from said first mode to said second mode, presenting said browser window associated with the second group of resources in said first mode, and displaying information representing the resource identified by said link.

12. The method of claim 1, wherein said presenting said browser window in said second mode includes presenting said associated group of resources as one of an icon, a tab and a thumbnail, the method further comprising:

receiving user input representing the selection of said browser window presented in the second mode; and changing the presentation of said browser window from said second mode to said first mode, and displaying said content provided by said identified resource belonging to said associated group of resources.

13. The method of claim 12, wherein said identified resource belonging to said associated group of resources is selected from the group consisting of a default resource for the associated group of resources, and a most important resource belonging to said associated group of resources as determined by an importance score calculated for each resource classified as belonging to said associated group of resources, said importance score calculated based on a set of rules selected from the group consisting of: a rule producing a user interaction score; a rule producing a document interaction score; a rule producing an encryption level score; a rule producing a loading score; a rule producing a last document score; a rule producing a classification score; a rule producing an automatic reloading score; a rule producing a root node score; and a rule producing an interactive loading score.

14. The method of claim 1, wherein said second information includes at least one of: text entered in HTML form elements, selected buttons, list selections, and scroll position.

15. An apparatus comprising:
a computer processor programmed to execute the method as recited in claim 1.

16. A non-transitory computer-readable medium on which is embodied instructions which, when executed by a computer processor, causes the processor to execute the method as recited in claim 1.

17. A method of representing a plurality of web browser windows in one of two modes, comprising:
maintaining a representation of a plurality of resources in memory, said resources being accessible from said web browser;
associating subsets of said plurality of resources with respective browser windows;
for each subset of resources,
presenting said associated browser window in one of two modes, where in a first mode said browser window is open and content provided by a resource belonging to said subset of resources is displayed, and in a second mode the associated browser window is minimized;
upon switching from presenting the associated browser window in said first mode to presenting said associated browser window in said second mode,
retaining first information identifying the resource providing the content that is displayed in said associated browser window in said first mode;
retaining second information relating to a state in which content provided by said resource was presented prior to switching from presenting said associated browser window in said first mode to presenting said associated browser window in said second mode, said state including (i) data and selections entered by a user via an interactive control of said resource and (ii) a scroll position; and
minimizing said associated browser window, and
upon switching from presenting said associated browser window in said second mode to presenting said associated browser window in said first mode, opening said associated browser window;
using said first information to load said resource; and
using said second information to display content provided by said resource in accordance with said particular state,
wherein said second information is retained after said web browser is closed and, when said web browser is subsequently reopened and the data of said resource belonging to said subset of resources is reloaded, said retained second information is used to display the content of said reloaded resource in said prior state, and
wherein said browser is configured to toggle between displaying one open browser window presented in the first mode and displaying a grid representing a plurality of said minimized browser windows presented in the second mode.

18. The method of claim 17, wherein said minimized browser windows are chosen from the group consisting of icons and thumbnails.

19. The method of claim 17, wherein the subset of resources associated with a browser window are associated through a common browser history independent from the browser history of any other browser window.

20. The method of claim 17, wherein the subset of resources associated with a browser window are associated through one or more common characterizing features.

\* \* \* \* \*